United States Patent
Al-Shafei

(10) Patent No.: US 8,029,618 B2
(45) Date of Patent: Oct. 4, 2011

(54) MANUFACTURE OF PORTLAND CEMENT USING SPENT CLAUS CATALYST

(75) Inventor: Mansour A. Al-Shafei, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 595 days.

(21) Appl. No.: 11/631,823

(22) PCT Filed: Sep. 21, 2005

(86) PCT No.: PCT/US2005/034339
§ 371 (c)(1),
(2), (4) Date: Jun. 20, 2007

(87) PCT Pub. No.: WO2006/034487
PCT Pub. Date: Mar. 30, 2006

(65) Prior Publication Data
US 2007/0265173 A1 Nov. 15, 2007

(51) Int. Cl.
*C04B 7/24* (2006.01)
(52) U.S. Cl. .......................... 106/745; 106/713; 106/724
(58) Field of Classification Search .................. 106/713, 106/724, 745
See application file for complete search history.

(56) References Cited

U.S. PATENT DOCUMENTS

| | | | | |
|---|---|---|---|---|
| 4,081,285 A | * | 3/1978 | Pennell | 106/740 |
| 4,180,554 A | * | 12/1979 | Goddin et al. | 423/574.1 |
| 4,183,823 A | * | 1/1980 | George | 502/22 |
| 4,231,801 A | * | 11/1980 | Dunton | 106/714 |
| 7,479,230 B2 | * | 1/2009 | Kennard et al. | 210/688 |
| 2005/0194320 A1 | * | 9/2005 | Kennard et al. | 210/688 |

FOREIGN PATENT DOCUMENTS

| | | | |
|---|---|---|---|
| GB | 144632 | * | 8/1976 |
| SU | 1077860 | * | 6/1987 |
| WO | WO 2005/042130 A1 | * | 5/2005 |

OTHER PUBLICATIONS

SU 1549585 (Grunvald et al.) Mar. 15, 1990 abstract only.*

* cited by examiner

*Primary Examiner* — Paul Marcantoni
(74) *Attorney, Agent, or Firm* — Abelman, Frayne & Schwab

(57) ABSTRACT

Spent Claus catalyst having a high alumina content is used as an ingredient in the manufacture of Portland cements in place of all or a portion of a conventional source of alumina. The spent Claus catalyst is preferably of a small particle size and can be ground to the desired fineness before mixing with the other ingredients that are heated in a conventional kiln to produce the cement composition. Finely ground spent Claus catalyst can also be used as an additive at levels of 0.1% to 2% by weight to increase the thickening time of shallow casing cement slurries.

10 Claims, No Drawings

MANUFACTURE OF PORTLAND CEMENT USING SPENT CLAUS CATALYST

FIELD OF THE INVENTION

This invention relates to the use of spent Claus catalyst particles in the production of Portland cement.

BACKGROUND OF THE INVENTION

The Claus process continues to be the most widely used process worldwide to convert hydrogen sulfide that has been stripped from acid gas or refinery off-gas streams to elemental sulfur. It consists of a two-stage process: the first process stage is thermal and the second stage is catalytic. During the thermal process, the $H_2S$ is partially oxidized with air in a reaction furnace at high temperatures, e.g., from 1000°-1400° C. Sulfur is formed, but some $H_2S$ remains unreacted and $SO_2$ is also formed, as depicted below:

$$2H_2S + 3O_2 \rightarrow 2SO_2 + 2H_2O \qquad (I)$$

During the catalytic process, the remaining $H_2S$ is reacted with the $SO_2$ at lower temperatures, i.e., about 200°-350° C., over a catalyst to produce additional elemental sulfur, as follows:

$$2H_2S + SO_2 \rightarrow 3S_x + 2H_2O \qquad (II)$$

The Claus catalyst which offers improved sulfur conversion over spherical activated bauxite, or alumina, has high surface area, low density and high macroporosity. These properties provide maximum activity for the conversion of sulfur compounds. The art relating to the production of Claus catalysts is well developed, as shown, for example, in U.S. Pat. No. 4,364,858 and the numerous patents cited and discussed there. However, the reaction does not go to completion, even with the best catalyst. For this reason, two or three catalytic stages are used, with sulfur being removed between the stages.

Claus catalyst is deactivated due to lay down of coke and sulfur-containing species causing lowering of sulfur recovery and also polluting the atmosphere by releasing excessive amounts of sulfur dioxide during acid gas flaring. The deactivation of the Claus catalyst is caused by a variety of factors, such as the presence of accompanying hydrocarbons, particularly of C-5's and benzene, toluene and xylenes. Sour gases are prone to lay down coke on Claus catalyst due to thermal cracking in the split-flow mode.

Hundreds of tons/year of spent Claus catalyst are produced by gas processing plants, gas-oil separation plants (GOSPs) and natural liquid gas fractionation facilities due to frequent replacement of the alumina catalyst beds. In many instances, the spent catalyst has been disposed of by dumping it in a landfill. The cost of landfilling spent Claus catalyst is generally minimal where the land is available and inexpensive, the principal cost being its transportation.

National and international regulations have provided increased opportunities and economic incentives for the petroleum and gas processing industries to implement waste reduction programs for the purpose of enhancing the environment. The incentives for waste minimization on an international basis have been increased by the ban on the land disposal of untreated wastes from the petroleum industry. As the complexity and cost of waste management and disposal increases, waste minimization becomes a significant priority for industry and government.

The goal of reducing waste material from industrial processes requiring disposal can be accomplished either by regeneration of the material or by finding a new and economical use for the spent Claus catalyst waste material.

In some instances, the regeneration treatment cost has been found to be more expensive than purchasing fresh catalyst and, therefore, regeneration was not economically viable.

Other proposals for utilizing spend catalytic materials in an environmentally acceptable manner can also be found in the prior art. For example, U.S. Pat. No. 5,032,548 and U.S. Pat. No. 5,096,498 recommend the use of catalyst particles within a prescribed size range as a base in large construction projects, such as roads and levees. However, the spent catalyst must also be mixed with hydrated lime, Portland cement and other binders.

The use of spent catalyst fines admixed with concrete is disclosed in U.S. Pat. No. 4,231,801. The use of catalyst particles in the process for manufacturing a Portland cement prior to the burning step is disclosed, but it also teaches the addition of an agglomerating material.

It is therefore a principal object of the present invention to provide a means of economically and beneficially utilizing the spent Claus catalyst in order to provide an alternative to landfill disposal.

A further object of the invention is to provide new uses for spent Claus catalyst that will have a significant favorable environmental and cost-saving impact on those industries that must dispose of the spent catalyst.

SUMMARY OF THE INVENTION

The above objects and other advantages are achieved by the method and composition of the invention that broadly contemplates the addition of spent Claus catalyst as an additive, or raw material, in the manufacture of Type I, II and V Portland cement.

The spent Claus catalyst is comprised principally of alumina, or $Al_2O_3$. This compound is an essential additive for the production of Portland cement, which contains about 5% of alumina.

Portland cement is composed of lime or limestone, alumina, iron oxide and silica and is manufactured by burning all of these materials in pre-determined is proportions in a rotary kiln at temperatures in the range of 1450°-1500° C. Small amounts of magnesia, sodium, potassium and sulfur are also present. The principal reactions are represented by the following:

$$CaCO_3 \text{ (limestone)} \rightarrow CaO + CO$$

$$7CaO + Al_2Si_2O_7 \rightarrow Ca_2SiO_4 + Ca_3Al_2O_6$$

The product formed in the kiln is known as clinker. The clinker is allowed to cool and then is ground to a fine powder along with a small percentage (4-5%) of gypsum or its derivatives. This finely blended powder is known as Portland cement.

The silica can be provided from a number of sources, including clay, sand, quartz, and other materials that are well known in the art. A portion of the alumina-containing material is replaced by the spent Claus catalyst.

Spent Claus catalyst utilization in the production of Portland cement will provide significant environmental and cost-saving benefits since the volume of cement manufacturing and use in the areas where the spent Claus catalyst is generated will likely be sufficient to utilize all or a significant proportion of this waste material, thereby eliminating the need for landfill disposal of the spent catalyst.

In this application of the invention, the spent catalyst may contain residual hydrocarbons that will be released and/or oxidized during heating in the kin. Should tests of the finished cement and/or its concrete products indicate the presence of residual hydrocarbons, the end use applications should exclude closed structures used by personnel and animals due to the potential presence of such hydrocarbons. Alternatively, the spent Claus catalyst can be treated thermally and/or chemically to remove, or reduce to an acceptable level, any hydrocarbons that may originally have been be present.

DETAILED DESCRIPTION OF THE INVENTION

The methods and compositions of the preferred embodiments of using the spent Claus catalyst are described in the context of the examples which follow. These examples are directed to the utilization of spent Claus catalyst as a raw material in the manufacture of Types I, II and V cement.

In preparing the representative samples for this embodiment of the process and product of the invention, spent Claus catalyst having a high alumina content was blended with other conventional ingredients to manufacture a Portland cement of the type used in the construction of infrastructure and other building projects. The cured concrete product was acceptable in terms of its physical performance characteristics.

In order to determine the composition of spent Claus catalyst particles, four spent Claus catalyst samples from different petroleum processing plants and processes were analyzed utilizing X-ray fluorescence spectrometry. The catalysts were presumed to be from different batches and may have been from different commercial producers. Each of the samples was ground in an agate pulverizer to a fineness of about 100 mesh and mixed thoroughly before being exposed to the X-ray beam. These samples were composed mainly of aluminum, carbon, sulfur, hydrocarbon and traces of other metals. Sample A contained higher aluminum oxide content and less carbon and hydrocarbon components when compared to other spent catalyst samples. The alumina content of the samples ranged from about 74% to 84% by weight.

The composition in weight percent of four spent Claus catalysts as received are reported in Table 1.

TABLE 1

| Compound | Sample 1 Wt % | Sample 2 Wt % | Sample 3 Wt % | Sample 4 Wt % |
|---|---|---|---|---|
| $SiO_2$ | <.01 | <.01 | <.01 | 0.01 |
| $Al_2O_3$ | 83.74 | 74.84 | 75.31 | 74.35 |
| $Fe_2O_3$ | <.01 | <.01 | <.01 | <.01 |
| CaO | 0.09 | 0.08 | 0.07 | 0.08 |
| MgO | 0.23 | 0.20 | 0.20 | 0.20 |
| $SO_3$ | 0.09 | 0.27 | 0.29 | 0.20 |
| $Na_2O$ | 0.28 | 0.25 | 0.26 | 0.25 |
| $K_2O$ | <.01 | <.01 | <.01 | <.01 |
| $TiO_2$ | <.01 | <.01 | <.01 | <.01 |
| $P_2O_5$ | <.01 | <.01 | <.01 | <.01 |
| $Mn_2O_3$ | 0.01 | 0.01 | 0.01 | 0.01 |
| SrO | 0.02 | 0.02 | 0.02 | 0.02 |
| $Cr_2O_3$ | <.01 | <.01 | <.01 | <.01 |
| ZnO | 0.01 | 0.01 | 0.01 | 0.01 |
| L.O.I. (950° C.) | 15.54 | 23.99 | 23.61 | 24.44 |
| Total | 100.01 | 99.66 | 99.77 | 99.56 |

The Loss on Ignition (L.O.I.) reported above was conducted at 950° C.

Four different cement formulations were prepared using the four different spent Claus catalysts Samples 1-4 that are composed mainly of alumina, and were mixed with limestone, sand, clay and iron ore. A fifth (control) mix was prepared from conventional raw materials to produce five typical U.S. type V cements. The tests were conducted at an independent laboratory and are reported in Table 2. The quantities of each ingredient are in grams.

TABLE 2

| | Control | Mix 1 | Mix 2 | Mix 3 | Mix 4 |
|---|---|---|---|---|---|
| Limestone | 1287 | 1362 | 1365 | 1365 | 1365 |
| Clay | 232 | 0 | 0 | 0 | 0 |
| Iron Ore | 26 | 35 | 35 | 35 | 35 |
| Sand | 0 | 113 | 113 | 113 | 113 |
| Spent Claus Catalyst | 0 | 30 | 30 | 30 | 30 |
| Total | 1545 | 1540 | 1543 | 1543 | 1544 |

The projected mineralogical composition of clinkers, as a percentage (%), is shown in Table 3.

TABLE 3

| | Typical Range | Control | Mix 1 | Mix 2 | Mix 3 | Mix 4 |
|---|---|---|---|---|---|---|
| $C_3S$ tricalcium silicate | 43 to 70 | 60.0 | 60.0 | 61.9 | 60.8 | 60.0 |
| $C_2S$ dicalcium silicate | 11 to 31 | 16.6 | 16.3 | 16.0 | 16.1 | 17.0 |
| $C_3A$ tricalcium aluminate | 0 to 5 | 3.6 | 4.0 | 4.3 | 4.3 | 4.3 |
| $C_4AF$ tetracalcium aluminoferrite | 10 to 19 | 10.9 | 10.9 | 12.1 | 12.2 | 12.2 |

The materials utilized in the formulations of Table 2 were crushed, blended and ground in a porcelain jar mill to the fineness of 85% passing a 76 µm sieve. Briquettes of about 100 grams each were prepared in a Carver hydraulic press. The specimens were pre-heated at 900° C. and fired at 1450° C. in a Blue M high-temperature furnace.

After firing, the clinker briquettes having the composition of Table 3 were crushed and ground to a Blaine specific surface of 340 $m^2/Kg$ with an addition of 5% Terra Alba gypsum. The resulting cements were analyzed by XRF. The results of this analysis of the cement chemical composition, as wt %, is reported in Table 4.

TABLE 4

| | Control | Mix 1 | Mix 2 | Mix 3 | Mix 4 |
|---|---|---|---|---|---|
| $SiO_2$ | 20.44 | 20.85 | 20.41 | 21.11 | 21.54 |
| $Al_2O_3$ | 3.47 | 4.22 | 4.07 | 4.18 | 4.20 |
| $Fe_2O_3$ | 3.61 | 4.00 | 3.98 | 4.07 | 4.10 |
| CaO | 64.32 | 63.76 | 64.86 | 63.98 | 63.69 |
| MgO | 2.34 | 1.90 | 1.87 | 1.94 | 1.98 |
| $SO_3$ | 2.56 | 2.49 | 2.56 | 2.60 | 2.59 |
| $Na_2O$ | 0.20 | 0.09 | 0.09 | 0.09 | 0.10 |
| $K_2O$ | 0.31 | 0.26 | 0.25 | 0.26 | 0.25 |
| $TiO_2$ | 0.21 | 0.13 | 0.13 | 0.14 | 0.14 |
| $P_2O_5$ | 0.03 | 0.02 | 0.02 | 0.02 | 0.02 |
| $Mn_2O_3$ | 0.04 | 0.04 | 0.04 | 0.04 | 0.04 |
| SrO | 0.04 | 0.04 | 0.04 | 0.04 | 0.04 |
| $Cr_2O_3$ | <.01 | <.01 | <.01 | <.01 | <.01 |
| ZnO | <.01 | <.01 | <.01 | <.01 | <.01 |

The resulting cements were tested for compressive strength in mortar cubes according to ASTM C 109, the results of which are reported in Table 5. The mortar cube strength is in psi.

TABLE 5

|  | Control | Mix 1 | Mix 2 | Mix 3 | Mix 4 |
|---|---|---|---|---|---|
| 3 days | 2440 | 2280 | 2260 | 2380 | 2450 |
| 7 days | 3620 | 3080 | 3140 | 3010 | 3300 |
| 28 days | 4620 | 4670 | 4630 | 5020 | 5210 |

The data in Table 5 shows some variations in the strength of cement specimens, but these variations are not significant and the specimens are considered to be of substantially the same quality. It is evident that replacement of clay with the Claus catalyst sand mix did not negatively affect the cement's performance.

Another analysis was carried out to evaluate burnability of the four mixing formulations. Burnability is the term used to indicate the reactivity of the kiln feed with respect to forming clinker minerals during the burning process, and is usually measured by the free lime content of the clinker. The lower the temperature at which the targeted free lime can be obtained, the better is the burnability of the kiln feed. One procedure for characterizing the burnability of a kiln feed is to perform laboratory burns under standardized conditions and to then analyze for the resulting free lime content Results from such tests can then be compared, and the raw materials and mix compositions giving the best burnability values can be selected by comparison. Burnability can also be predicted by the chemical and mineralogical parameters of the raw mix.

The burnability of the five mixes described above was evaluated according to the equations developed by F. L. Smidth as follows:

$$FL_{1400} = 0.31(LSF-100) + 2.18(Ms-1.8) + 0.73Q_{45} + 0.33C_{125} + 0.34A_{45} \quad (1)$$

$$FL_{1500} = 0.21(LSF-100) + 1.59(Ms-1.8) + 0.40Q_{45} + 0.22C_{125} + 0.08A_{45} \quad (2)$$

Where:
$FL_{1400}$="Virtual burnability index", or free lime content anticipated in a to commercial clinker fired at 1400° C.;
$FL_{1500}$=same, at 1500° C.;
LSF=lime saturation factor;
Ms=silica ratio;
$Q_{45}$=% of quartz>45 µm;
$C_{125}$=% of calcite>125 µm; and
$A_{45}$=% of insoluble particles>45 µm.

The importance of this determination is its use in evaluating the effect of possible changes in (1) chemical composition, or (2) mineralogy and fineness, or (3) both.

Both analytical and direct empirical approaches were used. For determination of the parameters included in the equations (1) and (2), the chemical parameters of the lime saturation factor and silica ratio were taken from the chemical analyses. For measurement of the particle sizes, the material was screened through Nos. 120 and 325 mesh sieves, being 125 and 45 µm, respectively. The +45 µm residue was treated with acetic acid to dissolve the carbonate particles. The residues were examined microscopically by a point-count technique and the particle sizes in raw mixes are reported in Table 6.

TABLE 6

|  | Control | Mix 1 | Mix 2 | Mix 3 | Mix 4 |
|---|---|---|---|---|---|
| Residue >125 µm | 1.4 | 5.8 | 6.3 | 6.0 | 6.2 |
| Calcite in residue | 76.3 | 50.3 | 54.3 | 55.3 | 56.3 |
| Calcite >125 µm in | 1.1 | 2.9 | 3.4 | 3.3 | 3.5 |

TABLE 6-continued

|  | Control | Mix 1 | Mix 2 | Mix 3 | Mix 4 |
|---|---|---|---|---|---|
| total sample |  |  |  |  |  |
| >45 µm residue (acid wash) | 5.2 | 9.7 | 9.4 | 10.2 | 10.1 |
| Quartz in residue | 26.6 | 36 | 42.3 | 38.6 | 29 |
| Acid-insoluble particles >45 µm in residue | 73.4 | 64 | 57.7 | 61.4 | 71 |
| Quartz >45 µm in total sample | 1.4 | 3.5 | 4 | 3.9 | 2.9 |
| Other acid-insoluble particles >45 µm in total sample | 3.8 | 6.2 | 5.4 | 6.3 | 7.2 |

The results of calculations are shown in Table 7 as the virtual burnability index of the mixes

TABLE 7

| FL | Control | Mix 1 | Mix 2 | Mix 3 | Mix 4 |
|---|---|---|---|---|---|
| 1400 | 2.87 | 5.81 | 6.07 | 6.27 | 5.91 |
| 1500 | 1.32 | 2.75 | 3.00 | 3.01 | 2.72 |

Direct free lime determination was conducted using the following procedure. Raw meal pellets of about 13 mm in size were prepared and dried, and pre-calcined at 900° C. The pellets were further fired at 1350° C., 1400° C. and 1450° C. for 20 minutes in an electric furnace. Free CaO, or free lime content was analyzed as the principal criterion of the lime digestion which is reported in Table 8. The fired samples were also subjected to microscopic examination as will be described below.

TABLE 8

| ° C. | Control | Mix 1 | Mix 2 | Mix 3 | Mix 4 |
|---|---|---|---|---|---|
| 1350 | 0.76 | 1.48 | 2.26 | 1.54 | 1.5 |
| 1400 | 0.42 | 0.72 | 0.69 | 0.58 | 0.74 |
| 1450 | 0.35 | 0.50 | 0.51 | 0.43 | 0.60 |

When analyzing the data from Tables 7 and 8, it is to be noted that, due to the vastly different firing conditions in a commercial kiln and a laboratory furnace, the "virtual burnability" values in Table 7 are not identical to the actual free lime in Table 8. However, the values clearly demonstrate the trends in the burnability of the mixes. In the experimental burns, all mixes produced equally acceptable results. However, the data indicates that the control mix possessed better burnability characteristics due to the finer sizes of quartz and silicate particles. Generally, poor quartz grindability can lead to the necessity of finer grinding raw materials containing sand and similar ingredients to avoid problems in burning.

Microscopic examination was also undertaken to detect any irregularities in the clinker formation. The purpose of this microscopic examination was to assist in the selection of the proportions of ingredients in the final cement formulations. For the purpose of this examination, the samples were identified as set forth in Table 9.

TABLE 9

| Sample ID | Mix | Temperature, ° C. |
|---|---|---|
| C-135 | Control | 1350 |
| C-140 | Control | 1400 |
| C-145 | Control | 1450 |
| 1-135 | 1 | 1350 |

TABLE 9-continued

| Sample ID | Mix | Temperature, ° C. |
|---|---|---|
| 1-140 | 1 | 1400 |
| 1-145 | 1 | 1450 |
| 2-135 | 2 | 1350 |
| 2-140 | 2 | 1400 |
| 2-145 | 2 | 1450 |
| 3-135 | 3 | 1350 |
| 3-140 | 3 | 1400 |
| 3-145 | 3 | 1450 |
| 4-135 | 4 | 1350 |
| 4-140 | 4 | 1400 |
| 4-145 | 4 | 1450 |

The results of the microscopic examination indicated that spent Claus catalysts samples using clay did not lead to any abnormalities in the clinker microstructure. Certain characteristics such as non-uniform distribution and formation of belite nests can be attributed to the relatively coarse sizes of the quartz grains. Under actual production conditions, the meal fineness can be adjusted to accommodate the compositional changes.

As will be understood from the above description and data, spent Claus catalyst can be successfully used to produce a high quality Portland cement for use in the construction of facilities of various types. No special processing is required prior to addition of the spend Claus catalyst to the Kiln and the processing and handling of the clinkers can continue as with the prior art formulations. The invention thus meets the objectives of disposing of significant quantities of a material that has been considered a waste by-product of the petroleum refining industry in an economical and environmental acceptable manner.

A further aspect of the invention is directed to the use of spent Claus catalyst particles as an additive to modify the curing characteristics of an oilwell cement slurry for shallow casing cementing.

It has been found that when spent Claus catalyst is added to shallow is casing cement slurries, there is an increase in the thickening time of the shallow casing cement slurry, as measured by API10 procedures. The observed increase in thickening time occurred at additive levels of 0.1% and 2.0% of the spent catalyst.

In the practice of this preferred embodiment of the invention, the spent catalyst was ground or pulverized to particles in the size range of from 6.8-10.4 microns (μm) before addition to the slurry.

Table 10 reports the data from the evaluation of oilwell slurry cement samples with and without the additive.

TABLE 10

| Properties | Sample A | Sample B | Sample C | Sample D | Blank |
|---|---|---|---|---|---|
| CI-G SACK | 1.00 | 1.00 | 1.00 | 1.00 | 1.00 |
| TWTR % VOL | 100 | 100 | 100 | 100 | 100 |
| SCC Additive % BWOC | 0.100 | 1.00 | 2.00 | 5.00 | 0.00 |
| Thickening Time - minutes | Increase - 119 | Decrease | Increase | Decrease | 105 |

Blending spent catalyst into the cement slurry of shallow casing cement jobs gives an increase in the thickening time to 119 minutes compared to 105 minutes for unmodified class G cement formulations.

In order to adapt this spent catalyst for use as an additive in oilwell cement, the combined mixture of oilwell cement and spent catalyst must be easily pumpable for a sufficient time to allow proper placement of the slurry in the well. The desired consistency for the pumpable cement can be achieved by pulverizing the spent catalyst, which is in spherical form, to fine particles in the range of about 6.8-10.4 μm.

Although the above examples and description is comprehensive, it is intended to be illustrative and various modifications to the methods and is compositions described will be apparent to those of ordinary skill in the art. The full scope of the invention is therefore to be determined with reference to the claims that follow.

I claim:

1. A Portland cement produced in a heated kiln from a composition comprising an alumina-containing spent Claus catalyst that is added during formation of the Portland cement clinker.

2. The composition of claim 1, wherein the Claus catalyst is ground to a particle size of about 10 microns.

3. The composition of claim 1, wherein the Claus catalyst is crushed and ground to a fineness of 85% passing a 76 μm sieve.

4. The Portland cement of claim 1, wherein the spent Claus catalyst is recovered as a waste product from a petroleum process.

5. The Portland cement of claim 1, wherein the spent Claus catalyst contains sulfur and one or more hydrocarbon compounds.

6. A Portland cement composition formed in a kiln by heating a mixture comprising limestone, sand and spent Claus catalyst that is added during formation of the Portland cement clinker.

7. The composition of claim 6 in which the ratio of sand to spent Claus catalyst in the mixture is about 3:1 to 4:1.

8. A method of manufacturing a Portland cement comprising:
   a. adding to a kiln a mixture of ingredients that include limestone, sand and an alumina-containing spent Claus catalyst containing alumina;
   b. heating the kiln to a temperature of up to 1500° and mixing the ingredients to form clinkers;
   c. grinding the clinkers to form a fine powder that is Portland cement.

9. The method of claim 8, wherein the spent Claus catalyst contains from 70% to 85% $Al_2O_3$.

10. The method of claim 8, wherein the spent Claus catalyst constitutes from 1.5% to 3.0% by weight of the original mixture of ingredients.

* * * * *

UNITED STATES PATENT AND TRADEMARK OFFICE
CERTIFICATE OF CORRECTION

| | | |
|---|---|---|
| PATENT NO. | : 8,029,618 B2 | Page 1 of 1 |
| APPLICATION NO. | : 11/631823 | |
| DATED | : October 4, 2011 | |
| INVENTOR(S) | : Mansour A. Al-Shafei | |

It is certified that error appears in the above-identified patent and that said Letters Patent is hereby corrected as shown below:

Col. 8, Ln 30,
In claim 8, step (b), the phrase "1500°" should be changed to --1500°C--.

Signed and Sealed this
Tenth Day of January, 2012

David J. Kappos
*Director of the United States Patent and Trademark Office*